(12) United States Patent
Ohtsuki et al.

(10) Patent No.: US 9,097,284 B2
(45) Date of Patent: Aug. 4, 2015

(54) WHEEL BEARING APPARATUS FOR A VEHICLE

(75) Inventors: Hisashi Ohtsuki, Iwata (JP); Kouji Kametaka, Iwata (JP)

(73) Assignee: NTN Corporation, Osaka-shi (JP)

( * ) Notice: Subject to any disclaimer, the term of this patent is extended or adjusted under 35 U.S.C. 154(b) by 127 days.

(21) Appl. No.: 12/465,752

(22) Filed: May 14, 2009

(65) Prior Publication Data

US 2009/0220180 A1 Sep. 3, 2009

Related U.S. Application Data

(63) Continuation of application No. PCT/JP2007/001242, filed on Nov. 14, 2007.

(30) Foreign Application Priority Data

Nov. 14, 2006 (JP) .................................. 2006-308299
Dec. 25, 2006 (JP) .................................. 2006-347626

(51) Int. Cl.
| | |
|---|---|
| F16C 33/12 | (2006.01) |
| F16C 33/62 | (2006.01) |
| B60B 27/00 | (2006.01) |
| C21D 9/40 | (2006.01) |
| F16C 19/18 | (2006.01) |

(52) U.S. Cl.
CPC .............. *F16C 33/62* (2013.01); *B60B 27/0005* (2013.01); *B60B 27/0084* (2013.01); *B60B 27/0094* (2013.01); *C21D 9/40* (2013.01); *F16C 19/186* (2013.01); *F16C 33/12* (2013.01); *F16C 2240/80* (2013.01)

(58) Field of Classification Search
CPC ........................................................ F16C 33/12
USPC ...................... 384/544, 589, 912, 913, 625
See application file for complete search history.

(56) References Cited

U.S. PATENT DOCUMENTS 5,077,003 A * 12/1991 Muraoka et al. .............. 420/104

FOREIGN PATENT DOCUMENTS

| JP | 2004-108449 | 4/2004 |
|---|---|---|
| JP | 2004108449 A * | 4/2004 |
| JP | 2004-232669 | 8/2004 |

(Continued)

*Primary Examiner* — Justin Krause
*Assistant Examiner* — Gregory Prather
(74) *Attorney, Agent, or Firm* — Harness, Dickey & Pierce, P.L.C.

(57) ABSTRACT

A vehicle wheel bearing apparatus has an outer member formed, on its inner circumference, with double row outer raceway surfaces. An inner member includes a wheel hub integrally formed with a wheel mounting flange at its one end. The wheel hub outer circumference surface has double row inner raceway surfaces arranged opposite to the double row outer raceway surfaces. Double row balls are freely rollably contained between the outer raceway surfaces and inner raceway surfaces, respectively, of the outer member and the inner member. A pitch circle diameter of the double row ball group of the outer-side is larger than a pitch circle diameter of the double row ball group of the inner-side. At least the outer member and the wheel hub are formed of medium/high carbon steel including carbon of 0.40~0.80% by weight. The inner and outer raceway surfaces are formed, respectively, with predetermined hardened layers with a surface hardness of 58~64 HRC. The grain size number of austenite crystal grains of the metallographic structure in the hardened layers is selected larger than #7.

10 Claims, 5 Drawing Sheets

(56) References Cited

FOREIGN PATENT DOCUMENTS

| | | | |
|---|---|---|---|
| JP | 2004232669 A * | 8/2004 | |
| JP | 2005-061616 | 3/2005 | |
| JP | 2005061616 A * | 3/2005 | |
| JP | 2005-214229 | 8/2005 | |
| JP | 2005214229 A * | 8/2005 | |
| JP | 2005-273870 | 10/2005 | |
| JP | 2005273870 A * | 10/2005 | |
| JP | 2006-200700 | 8/2006 | |
| JP | 2006200700 A * | 8/2006 | |

* cited by examiner

WHEEL BEARING APPARATUS FOR A VEHICLE

CROSS-REFERENCE TO RELATED APPLICATIONS

This application is a continuation of International Application No. PCT/JP2007/001242, filed Nov. 14, 2007, which claims priority to Japanese Application Nos. 2006-308299, filed Nov. 14, 2006 and 2006-347626, filed Dec. 25, 2006. The disclosures of the above applications are incorporated herein by reference.

FIELD

The present disclosure relates to a wheel bearing apparatus that freely rotationally supports a wheel of a vehicle, such as an automobile and, more particularly, to a vehicle wheel bearing apparatus that increases its strength and durability to extend its life while simultaneously to achieving its accuracy and reduction of manufacturing costs.

BACKGROUND

Wheel bearing apparatus is used to freely rotationally support a wheel hub for mounting the wheel via a rolling bearing for a driving wheel and a driven wheel. For structural reasons, an inner ring rotation type is generally adopted for a driving wheel. Both inner ring rotation and outer ring rotation types are adopted for a driven wheel. Double row angular contact ball bearings are widely used in such a bearing apparatus for reasons that they have a desirable bearing rigidity, high durability against misalignment and small rotation torque to improve fuel consumption. The double row angular contact ball bearing has a structure with a plurality of balls that are interposed between a stationary ring and a rotational ring. Also, a predetermined contacting angle is applied to the balls relative to the stationary and rotational rings.

The bearing apparatus for a wheel of a vehicle is broadly classified into a first through fourth generation structure. In a first generation type, a wheel bearing with a double row angular contact ball bearing is fit between a knuckle forming part of a suspension and a wheel hub. In a second generation structure, a body mounting flange or a wheel mounting flange is directly formed on the outer circumference of an outer member. In a third generation structure, one of the inner raceway surfaces is directly formed on the outer circumference of the wheel hub. In a fourth generation structure, the inner raceway surfaces are directly formed on the outer circumference of the wheel hub and the constant velocity universal joint.

In prior art wheel bearing apparatus formed with a double row rolling bearing, since both bearing row arrangements are the same in the double row bearing, the apparatus has a sufficient rigidity during straight way running, however, optimum rigidity cannot always be obtained during curved way running. The positional relationship between the wheels and the bearing apparatus is usually designed so that the weight of the vehicle acts at substantially the center between the rows of bearing balls during the straight way running. However, a larger radial load and a larger axial load are applied to vehicle axles on the side opposite to the curving direction (i.e. axles of the left hand side of vehicle when right hand curving). Accordingly, it is effective to have a larger rigidity on the bearing row of the outer-side than that of the bearing row of the inner-side in order to improve the durability and strength of the bearing apparatus. Thus, a known vehicle wheel bearing apparatus is shown in FIG. 6 that can have a high rigidity without enlargement of the bearing apparatus. In the description below, the term "outer-side" (left hand side in the drawings) of the apparatus denotes a side that is positioned outside of the vehicle body. The term "inner-side" (right hand side in the drawings) of the apparatus denotes a side that is positioned inside of the body when the bearing apparatus is mounted on the vehicle body.

The vehicle wheel bearing apparatus 50 is formed by a double row angular contact ball bearing with an outer member 51 integrally formed on its outer circumference with a body mounting flange 51c to be mounted on a knuckle (not shown) of a vehicle. The outer member inner circumference has a double row outer raceway surfaces 51a, 51b. An inner member 55 includes a wheel hub 52 with a wheel mounting flange 53 integrally formed at one end for mounting a wheel (not shown). One inner raceway surface 52a is formed on the outer circumference of the wheel hub opposite to one 51a of the double row outer raceway surfaces 51a, 51b. A cylindrical portion 52b axially extends from the inner raceway surface 52a. An inner ring 54 is fit onto the cylindrical portion 52b. The inner ring is formed on its outer circumference with the other inner raceway surface 54a opposite to the other raceway surface 51b of the double row outer raceway surfaces 51a, 51b. Double row balls 56, 57 are freely rollably contained between the outer raceway surfaces 51a, 51b and inner raceway surfaces 52a, 54a of the inner member 55. Cages 58, 59 rollably hold the balls 56, 57.

The inner ring 54 is axially immovably secured by a caulked portion 52c. The caulked portion 52c is formed by radially outwardly plastically deforming the cylindrical portion 52b of the wheel hub 52. Seals 60, 61 are mounted in annular openings formed between the outer member 51 and the inner member 55. The seals 60, 61 prevent leakage of grease contained within the bearing apparatus and the entry of rain water or dusts into the bearing apparatus from the outside.

A pitch circle diameter D1 of the outer-side ball group 56 is set larger than a pitch circle diameter D2 of the inner-side ball group 57. Accordingly, the diameter of the inner raceway surface 52a of the wheel hub 52 is larger than the diameter of the inner raceway surface 54a of the inner ring 54. Also, the outer raceway surface 51a diameter of the outer-side of the outer member 51 is larger than the diameter of the outer raceway surface 51b of the inner-side of the outer member 51. Also, the number of outer-side balls 56 is larger than the number of the inner-side balls 57. By setting the pitch circle diameter D1 of the outer-side larger than the pitch circle diameter D2 of the inner-side (D1 D2), it is possible to obtain a large rigidity of the bearing apparatus 50 and thus extend its life. (Japanese Laid-open Patent Publication No. 108449/2004).

In prior art wheel bearing apparatus 50, the pitch circle diameter D1 of the outer-side ball group 56 is set larger than the pitch circle diameter D2 of the inner-side ball group 57. Accordingly, the diameter of the outer-side outer raceway surface 51a of the outer member 51 is formed larger than the diameter of the inner-side outer raceway surface 51b of the outer member 51. Additionally, these outer raceway surfaces 51a, 51b are formed with a hardened layer by high frequency induction quenching. This improves the rigidity of the outer-side bearing row. Thus, this assures the rolling fatigue life, strength and durability of the wheel bearing apparatus 50.

In the prior art wheel bearing apparatus, the inner member 55 has a moment load during driving of the vehicle via the wheel mounting flange 53. The inner raceway surface 52a suffers from a compressive stress from the balls 56 in addition to a bending stress caused by the moment load. Thus, the metal material forming the inner member 55 simultaneously suffers from a tensile stress caused by the bending stress and a shearing stress caused by the compressive stress. Accordingly, it is difficult to assure sufficient durability without a means for resisting these tensile stresses and shearing stresses.

Also in the wheel bearing apparatus, it is feared that impressions may be formed on the raceway surfaces, via the balls 56, when a vehicle rides over a curb. The impressions on the raceway surfaces would cause noise and shorten the fatigue life of the bearing apparatus.

In addition, any deformation would be caused on shoulders 62, 63 between the outer raceway surfaces 51a, 51b of the outer member 51 when the outer member 51 suffers from an excessive impact load. The shorter the pitch "P" between the double row balls 56, 57, the easier such a deformation may be caused. Accordingly, the hardened layers are usually formed not only on the double row outer raceway surfaces 51a, 51b but on the shoulders 62, 63 between the double row outer raceway surfaces 51a, 51b. However, not only do the manufacturing cost increase but accuracy is diminished due to the heat treatment deformation when the hardened layers are additionally formed on the shoulder portions 62, 63. In particular, since the wall thickness of the outer member 51 is reduced due to a pursuit to reduce weight, it is necessary to strictly ascertain whether or not the hardened layers should be formed on the shoulder portions 62, 63 in view of the strength, accuracy and manufacturing cost of the wheel bearing apparatus.

SUMMARY

It is an object of the present disclosure to provide a vehicle wheel bearing apparatus that can solve the problems and improve the impact resistance, strength, durability, accuracy and reduction of manufacturing cost of the bearing apparatus to extend its life.

To achieve the object, a vehicle wheel bearing apparatus comprises an outer member formed with double row outer raceway surfaces on its inner circumference. An inner member includes a wheel hub integrally formed at one end with a wheel mounting flange. The wheel hub is formed on its outer circumferential surface with double row inner raceway surfaces arranged opposite to the double row outer raceway surfaces. Double row balls are freely rollably contained between the outer raceway surfaces and inner raceway surfaces, respectively, of the outer member and the inner member. A pitch circle diameter of the double row ball group of the outer-side is larger than a pitch circle diameter of the double row ball group of the inner-side. At least the outer member and the wheel hub are formed of medium/high carbon steel including carbon of 0.40~0.80% by weight. The inner and outer raceway surfaces are formed, respectively, with predetermined hardened layers with a surface hardness of 58~64 HRC. The grain size number of austenite crystal grains of the metallographic structure in the hardened layers is selected larger than #7.

In the wheel bearing apparatus of the first through fourth generations provided with the double row rolling elements, a pitch circle diameter of the double row ball group of the outer-side is larger than a pitch circle diameter of the double row ball group of the inner-side. At least the outer member and the wheel hub are formed of medium/high carbon steel including carbon of 0.40~0.80% by weight. The inner and outer raceway surfaces are formed, respectively, with predetermined hardened layers with a surface hardness of 58~64 HRC. The grain size number of austenite crystal grains of the metallographic structure in the hardened layers is selected larger than #7. Thus, it is possible to increase the bearing rigidity of the outer-side portion as compared with the inner-side portion while effectively using the bearing space. Also, it is possible to extend the bearing life while keeping the impression resistance by forming the predetermined hardened layers on predetermined portions of the bearing member by high frequency induction quenching.

The outer diameter of each ball of the ball groups is the same as each other. The number of balls of the outer-side is larger than the number of balls of the inner-side. This makes it possible to further extend the bearing life while improving the rigidity of the bearing apparatus.

The outer member and the wheel hub are formed of medium/high carbon steel include Si: 0.5-1.0 wt %, Mn: 0.1-2.0 wt %, Cr: 0.4-1.0 wt %, O: 0.003 wt % or less, and residues of Fe and inevitable impurities. This makes it possible to keep the workability of the outer member and the wheel hub and to improve the rolling fatigue life while increasing the ease of quenching.

V (vanadium) of 0.01-0.15 wt % is added to the outer member and the wheel hub. This makes it possible to suppress the growth of austenite crystal grains during heat treatment. Thus, this refines the austenite crystal grains and forms carbide of high hardness in the steel material in order to improve the abrasion resistance and the rolling fatigue life.

The inner member includes the wheel hub with a wheel mounting flange at one end. The wheel hub is formed on its outer circumferential surface with one inner raceway surface arranged opposite to one of the double row outer raceway surfaces. The cylindrical portion axially extends from the inner raceway surface. An inner ring is formed, on its outer circumferential surface, with the other inner raceway surface arranged opposite to the other of the double row outer raceway surfaces. The inner ring is axially secured by a caulked portion. The caulked portion is formed by radially outwardly plastically deforming an end of the cylindrical portion. A substantially conical recess is formed on an end at the side of the wheel mounting flange of the wheel hub. The depth of the recess extends at least to a position near the bottom of the inner raceway surface of the wheel hub. The recess is formed so that the wall thickness of the wheel hub at its outer-side end portion is substantially constant. This assures the rigidity of the bearing apparatus and reduces the size and weight.

The distance "L" between the double row outer raceway surfaces determine whether or not to provide the hardened layer at the shoulder portions between the double row outer raceway surfaces. The hardened layer is provided only in the double row outer raceway surfaces and the shoulder portions remain as non-hardened portions. This makes it possible to provide a vehicle wheel bearing apparatus that can solve the problem of improving the impact resistance, strength, durability and accuracy and reduction of manufacturing cost of the bearing apparatus to extend its life.

The distance "L" is set at 14 mm. This makes it possible to reduce the steps of heat treatment which reduces the manufacturing cost. Also, it improves the accuracy of the outer member while suppressing deformation due to the heat treatment.

The effective depth of the hardened layers of the outer members is set to at least 2 mm. The minimum wall thickness at these portions is set to at least 4 mm. This prevents the generation of quenching cracks caused by over heating and simultaneously solves the antinomic problems of reducing the size and weight of the wheel bearing apparatus while increasing its rigidity and strength.

The vehicle wheel bearing apparatus comprises an outer member, formed on its inner circumference, with double row outer raceway surfaces. An inner member includes a wheel hub integrally formed, at one end, with a wheel mounting flange. The inner member is formed, on its outer circumferential surface, with double row inner raceway surfaces arranged opposite to the double row outer raceway surfaces. Double row balls are freely rollably contained between the outer raceway surfaces and inner raceway surfaces, respectively, of the outer member and the inner member. A pitch circle diameter of the double row ball group of the outer-side is larger than a pitch circle diameter of the double row ball group of the inner-side. At least the outer member and the wheel hub are formed of medium/high carbon steel including carbon of 0.40~0.80% by weight. The inner and outer raceway surfaces are formed, respectively, with predetermined hardened layers with a surface hardness of 58~64 HRC. The grain size number of austenite crystal grains of the metallographic structure in the hardened layers is selected larger than #7. Thus, it is possible to increase the bearing rigidity of the outer-side portion as compared with the inner-side portion while effectively using the bearing space. Also, it is possible to extend the bearing life while keeping the impression resistance by forming predetermined hardened layers on predetermined portions of the bearing member by high frequency induction quenching.

A vehicle wheel bearing apparatus comprises an outer member formed, on its outer circumference, with a body mounting flange to be mounted on a knuckle. The outer member, on its inner circumference, has double row outer raceway surfaces. An inner member includes a wheel hub and an inner ring. The wheel hub has an integrally formed wheel mounting flange at one end. Its outer circumference includes one inner raceway surface arranged opposite to one of the double row outer raceway surfaces. A cylindrical portion axially extends from the inner raceway surface. The inner ring is adapted to be fit onto the cylindrical portion of the wheel hub. The inner ring is formed, on its outer circumference, with the other inner raceway surface arranged opposite to the other of the double row outer raceway surfaces. Double row rolling elements are freely rollably contained between the outer and inner raceway surfaces, respectively, of the outer member and the inner member. The inner ring is axially secured on the wheel hub by a caulked portion. The caulked portion is formed by plastically deforming radially outward the end of the cylindrical portion of the wheel hub. A pitch circle diameter of the double row ball group of the outer-side is larger than a pitch circle diameter of the double row ball group of the inner-side. The outer diameter of each ball of the ball groups is the same as each other. The number of balls of the outer-side is larger than the number of balls of the inner-side. The outer member and the wheel hub are formed of medium/high carbon steel including carbon of 0.40~0.80% by weight. The inner and outer raceway surfaces are formed by high frequency induction quenching, respectively, with predetermined hardened layers with a surface hardness of 58~64 HRC. The grain size number of austenite crystal grains of the metallographic structure in the hardened layers is selected larger than #7.

Further areas of applicability will become apparent from the description provided herein. The description and specific examples in this summary are intended for purposes of illustration only and are not intended to limit the scope of the present disclosure.

DRAWINGS

Additional advantages and features of the present disclosure will become apparent from the subsequent description and the appended claims, taken in conjunction with the accompanying drawings, wherein:

FIGS. 3(a)-3(b) are explanatory views of patterns of hardened layers of the outer member, FIG. 3(a) shows a case of L≥14 mm, and FIG. 3(b) shows a case of L<14 mm.

Figure 4:
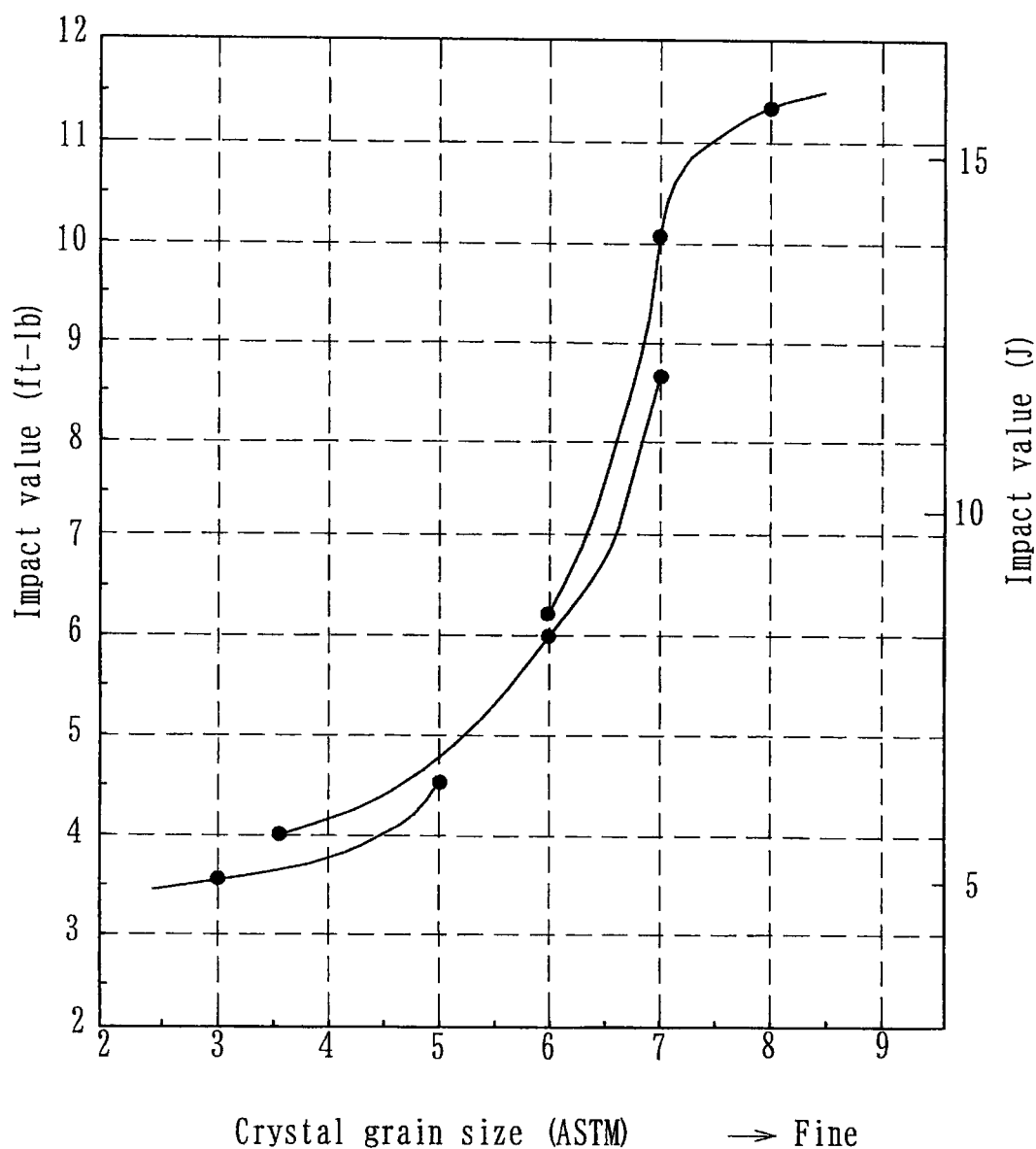

FIG. 4 is a graph illustrating a relationship between the austenite crystal grain size and the impact value.

Figure 5:
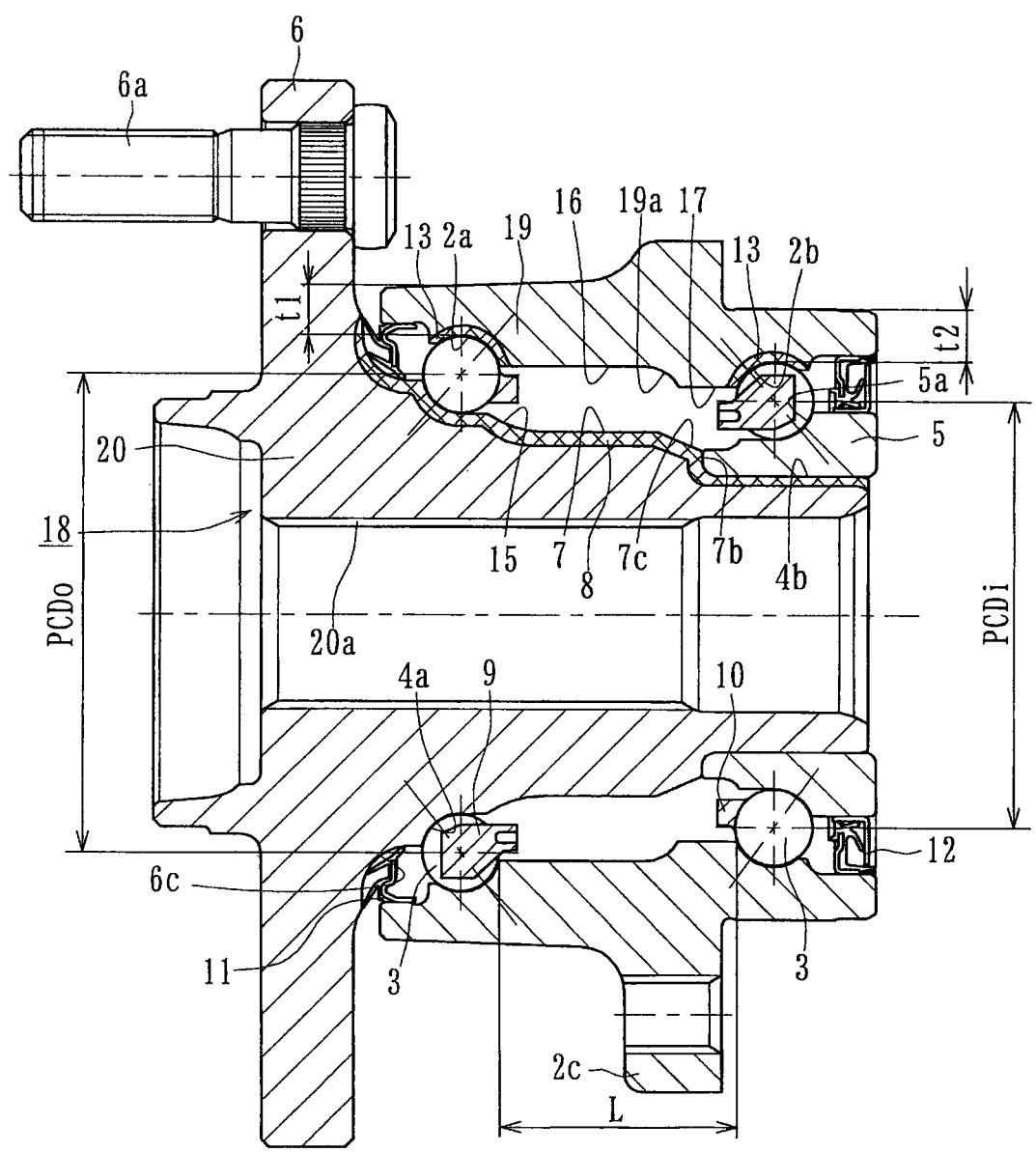

FIG. 5 is a longitudinal section view of a second embodiment of a vehicle wheel bearing apparatus.

Figure 6:
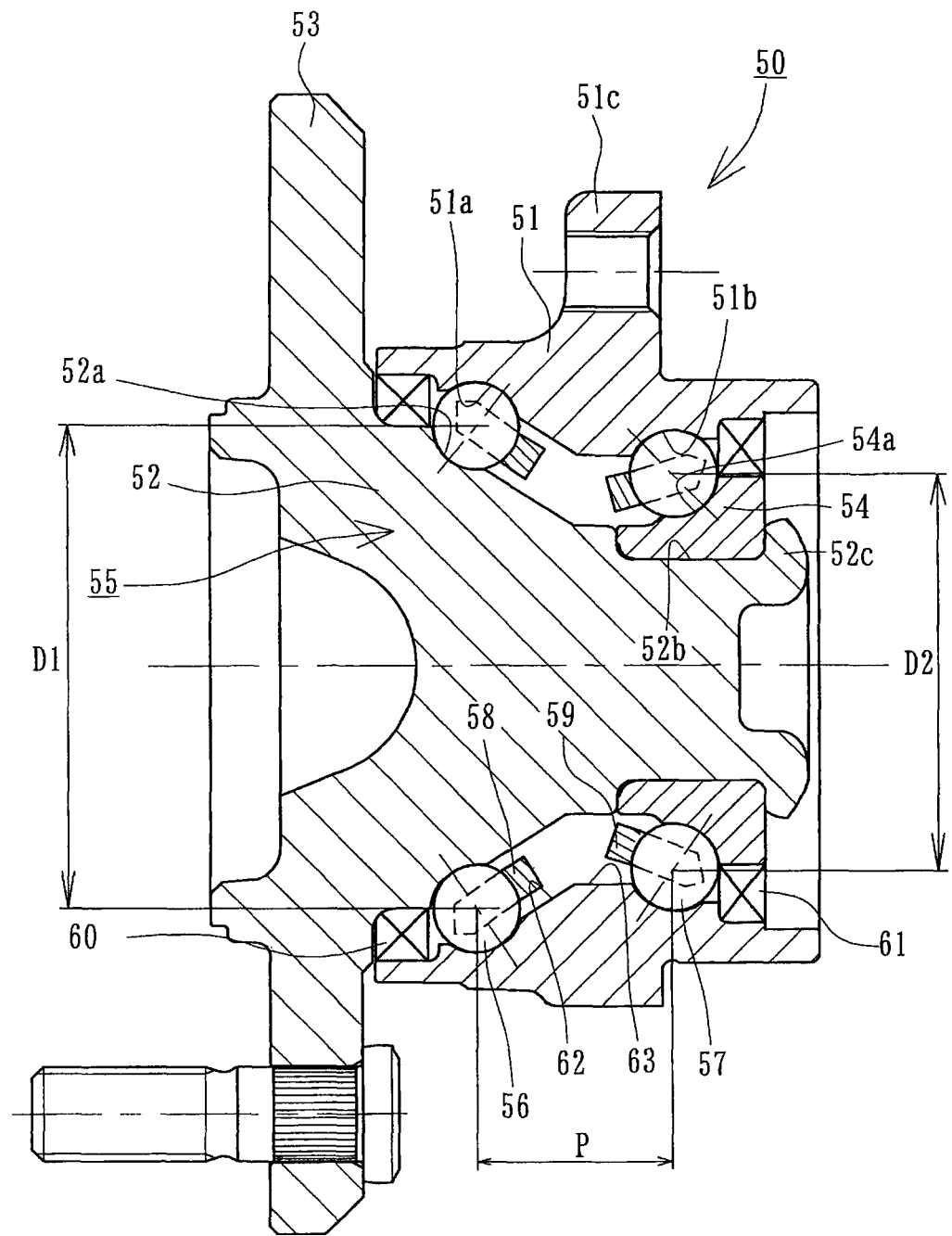

FIG. 6 is a longitudinal section view of a prior art vehicle wheel bearing apparatus.

DETAILED DESCRIPTION

Preferable embodiments of the present disclosure will be hereinafter described with reference to the drawings.

Figure 1:
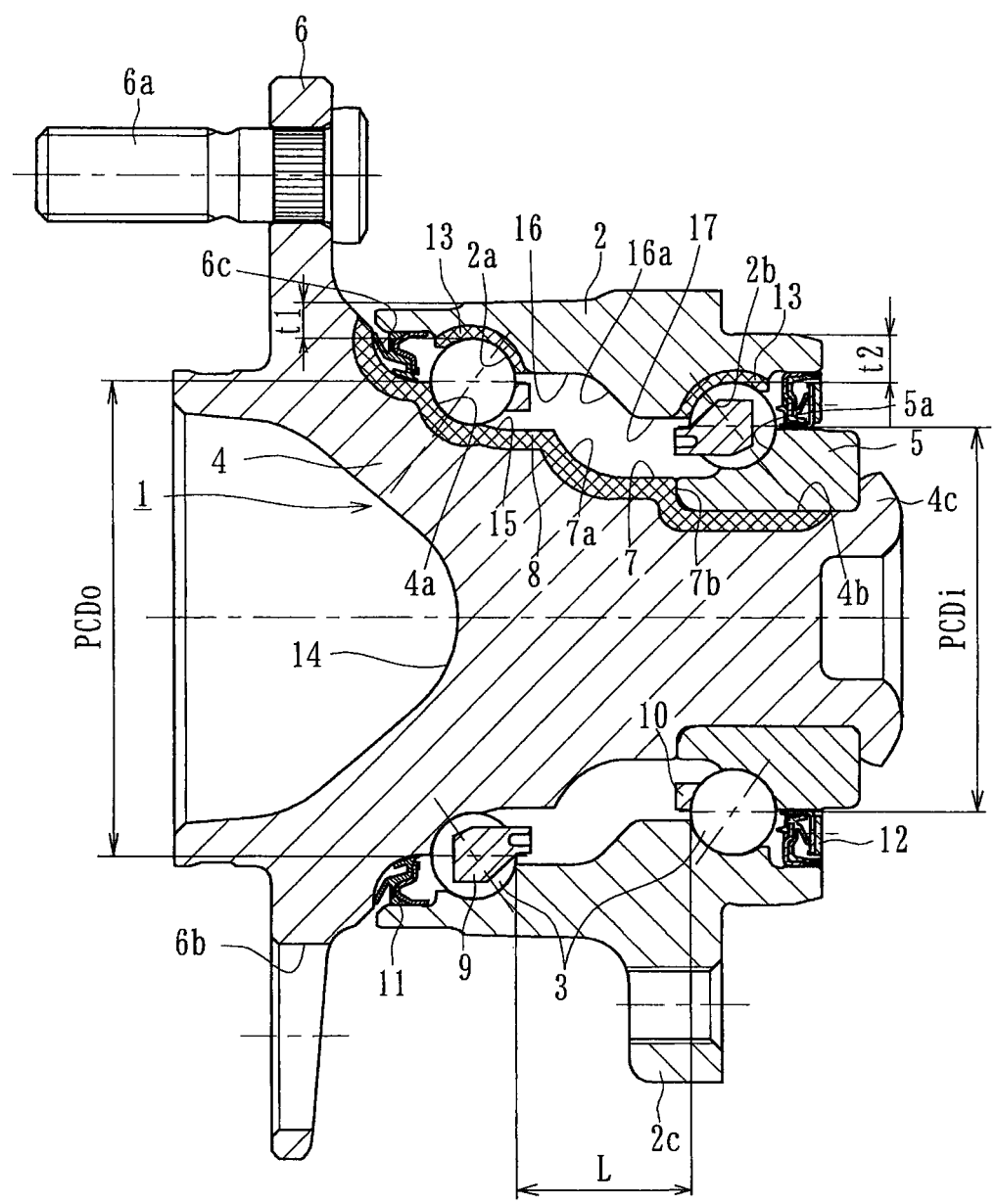
FIG. 1 is a longitudinal section view of a first embodiment of a vehicle wheel bearing apparatus.
Figure 2:
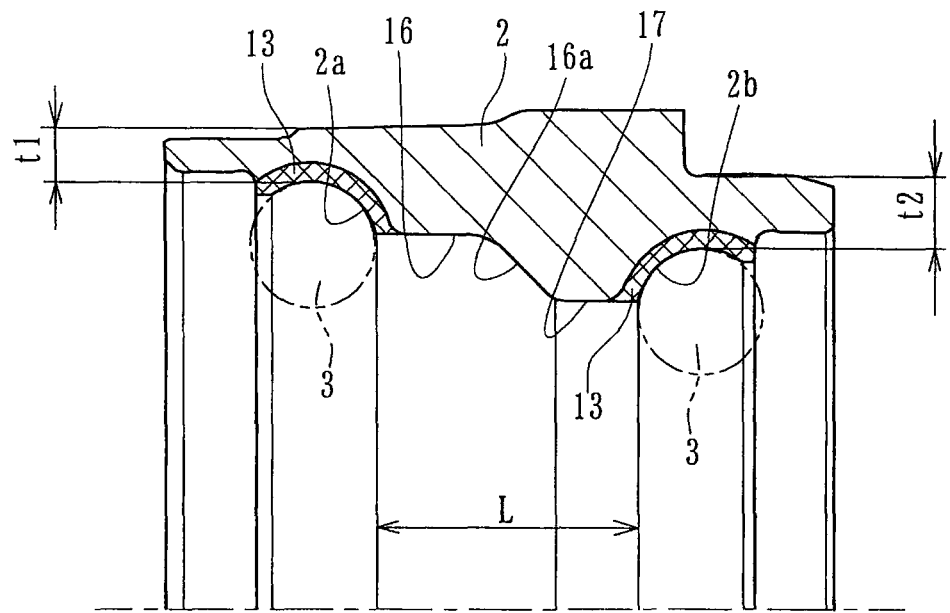
FIG. 2 is a cross-section view of an outer member of the vehicle wheel bearing apparatus of FIG. 1.
Figure 3:
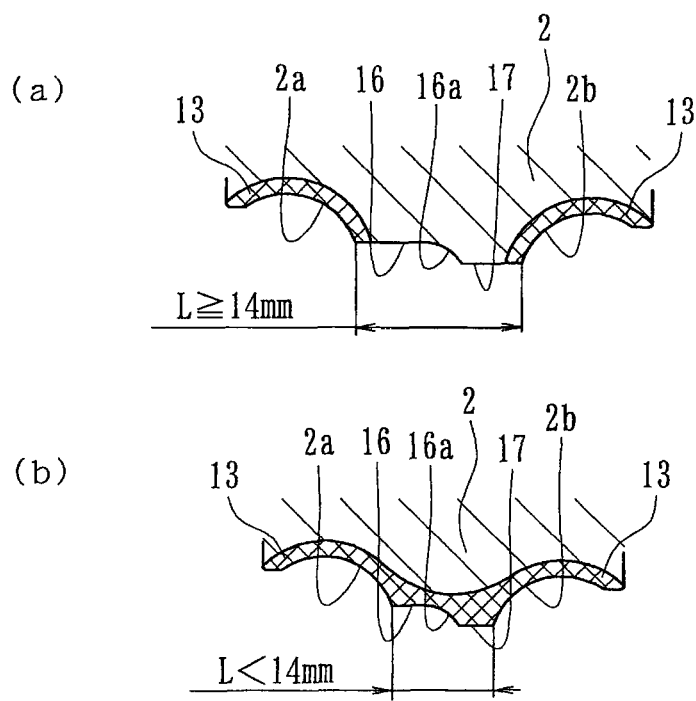

FIG. 1 is a longitudinal section view of a first embodiment of a vehicle wheel bearing apparatus. FIG. 2 is a cross-section view of an outer member of the vehicle wheel bearing apparatus of FIG. 1. FIG. 3 is an explanatory view showing patterns of hardened layers of the outer member. FIG. 4 is a graph showing a relationship between the austenite crystal grain size and the impact value.

The vehicle wheel bearing apparatus shown in FIG. 1 is a third generation type used for a driven wheel. It includes an inner member 1, an outer member 2, and double row rolling element (ball) groups 3, 3 that are rollably contained between the inner and outer members 1, 2. The inner member 1 has the wheel hub 4 and an inner ring 5 press fit onto the wheel hub 4, via a predetermined interference.

The wheel hub 4 is integrally formed with a wheel mounting flange 6 at its outer-side end. One (outer-side) inner raceway surface 4a is on the outer circumference of the wheel hub 4. A cylindrical portion 4b extends from the inner raceway surface 4a through a shaft-shaped portion 7. Hub bolts 6a are arranged on the wheel mounting flange 6 equidistantly along the periphery of the wheel mounting flange 6. Circular apertures 6b are formed between the hub bolts 6a. These circular apertures 6b contribute not only to the reduction of weight of the bearing apparatus but to passage of any fastening tool used to assemble and disassemble of the bearing apparatus.

The inner ring 5 is formed, on its outer circumference, with the other (inner-side) inner raceway surface 5a. The inner ring is adapted to be press fit onto the cylindrical portion 4b of the wheel hub 4 to form a double row angular contact ball bearing of back-to-back duplex type. It is axially secured by a caulked portion 4c that is formed by plastically deforming the end of the cylindrical portion 4b. The inner ring 5 and balls 3 are made of high carbon chrome steel such as SUJ2 and hardened to their core by dip quenching to have a surface hardness of 58~64 HRC.

The wheel hub 4 is made of medium/high carbon steel including carbon of 0.40~0.80% by weight such as S53C. It is hardened by high frequency induction quenching so that a region including the inner raceway surface 4a from the inner-side base 6c of the wheel mounting flange 6 to the cylindrical portion 4b is formed with a hardened layer 8 (shown by cross-hatching in an upper half of FIG. 1) with a surface hardness of 58~64 HRC. The caulked portion 4c surface hardness remains as is after forging. Accordingly, the wheel mounting flange 6 has a sufficient mechanical strength against rotary bending loads applied to it. The anti-fretting strength of the cylindrical portion 4b at a region press fit by the inner ring 5 can be improved. Also, the plastically deforming working of the caulked portion 4c can also be carried out without any micro cracks during the caulking process.

The outer member 2 is integrally formed, on its outer circumference, with a body mounting flange 2c that is mounted on a knuckle (not shown) of a vehicle. Its inner circumference has an outer-side outer raceway surface 2a arranged opposite to the inner raceway surface 4a of the wheel hub 4 and an inner-side outer raceway surface 2b arranged opposite to the inner raceway surface 5a of the inner ring 5. Double row ball groups 3, 3 are contained between the outer and inner raceway surfaces. The balls are rollably held by cages 9, 10. Seals 11, 12 are mounted within annular space openings formed between the outer member 2 and the inner member 1. The seals 11, 12 prevent leakage of grease contained in the bearing and the entry of rain water and dusts into the bearing from the outside.

The outer member 2 is made of medium/high carbon steel including carbon of 0.40~0.80% by weight such as S53C. The double row outer raceway surfaces 2a, 2b are formed with a hardened layer 13 (shown by cross-hatching in an upper half in FIG. 1). It is hardened by high frequency induction quenching to have a surface hardness of 58~64 HRC. Although the structure shown is a double row angular contact ball bearing using balls as the rolling elements 3, a double row tapered roller bearing using tapered rollers as the rolling elements 3 may be used. In addition, the wheel bearing apparatus of the present disclosure is not limited to the bearing structure of a third generation and may be applied to bearing structures of first, second and fourth generations.

Although the outer diameter of each ball 3 is the same, a pitch circle diameter PCDo of the outer-side ball group 3 is set larger than a pitch circle diameter PCDi of the inner-side ball group 3. Due to a difference in the pitch circle diameters PCDi and PCDo, the number of balls in ball group 3 in the outer-side is larger than the number of balls of ball group 3 in the inner-side.

The wheel hub 4 has an outline configuration continued from a groove bottom of the inner raceway surface 4a to the cylindrical portion 4b through a counter portion 15. A shaft-shaped portion 7 axially extends from the counter portion 15, via a stepped portion 7a, with a circular arc cross-section, and a shoulder 7b that abuts the inner ring 5. A substantially axially extending conical recess 14 is formed at an outer-side end portion of the wheel hub 4 in order to reduce the weight of the bearing apparatus. The recess 14 is formed by forging. The depth of the recess 14 extends to at least near the bottom of the outer-side inner raceway surface 4a of the wheel hub 4. Thus, the outer-side end portion of the wheel hub 4 has a substantially constant wall thickness.

The outer member 2 has its outer-side outer raceway surface 2a formed with a larger diameter than the diameter of the inner-side outer raceway surface 2b due to the difference of the pitch circle diameters PCDo and PCDi. A cylindrical shoulder portion 16 extends from the outer-side outer raceway surface 2a to a shoulder portion 17 of the inner-side outer raceway surface 2b, via a tapered step portion 16a.

In such a wheel bearing apparatus, it is usually designed so that the wheel hub 4 and the outer member 2 can endure a load corresponding to 0.8 G (G: gravitational acceleration) during curved way running of a vehicle. In such a case, the inner raceway surface 4a and the double row outer raceway surfaces 2a, 2b suffer from the maximum shearing stress over a depth of about 0.4 mm due to contact against the rolling elements. Since the hardened layers 8, 13 are required to have at least about five times the depth in case of the maximum shearing stress, the depth of the effective hardened layer becomes 2 mm at a minimum.

In addition it is necessary to take into consideration dispersion of the hardened layers 8, 13 formed by high frequency induction quenching in addition to the minimum depth of 2 mm. Accordingly, to satisfy a desirable rolling fatigue life, the hardened layers 8, 13 of the inner raceway surface 4a and the double row outer raceway surfaces 2a, 2b, are designed to have an effective hardened depth (3.5 mm) of about five times the depth in case of the maximum shearing stress depth which is determined by adding the dispersion depth due to the high frequency induction quenching to the minimum depth 2 mm.

As shown in FIG. 2, since it is possible that quenching cracks may be caused by over heating when the minimum wall thickness portions (in this case, groove bottom portions of the outer raceway surfaces 2a, 2b) become too thin, the minimum wall thickness t1, t2 are set at 4 mm with the remaining non-quenched portion (non-hardened layer) of about 0.5 mm. This makes it possible to solve the antinomic problems of reducing the size and weight of the bearing apparatus while increasing its rigidity and thus improving the strength and life of the bearing apparatus.

According to this embodiment, the hardened layers only remain in the double row raceway surfaces 2a, 2b. The inner circumference of the cylindrical portions 16, 17 are not quenched. This reduces the steps of heat treatment. Thus, the manufacturing cost is reduced. Also, this improves the accuracy of the outer member 2 while suppressing heat treatment deformation. According to tests performed by the applicant of the present application, in a case where the outer member 2 is thin as in this embodiment, and the distance "L" between the double row outer raceway surfaces 2a, 2b is set long, more particularly, in a case of L≥14 mm as shown in FIG. 3(a), the outer member 2 has sufficient rigidity against a moment load applied to the bearing apparatus. On the contrary, not only can a particular effect not be recognized, but the accuracy of the outer member 2 is worse although the hardened layer 13 would be continuously formed on the inner circumference of the shoulder portions 16, 17. On the other hand, in a case where the distance "L" between the double row outer raceway surfaces 2a, 2b, L<14 mm as shown in FIG. 3(b), the rigidity of the outer member 2 is increased by continuously forming the hardened layer 13 on the inner circumference of the shoulder portions 16, 17. Also, it has been found that any essential difference cannot be caused either in the number of heat treating steps and heat treatment deformation.

As described above, a distance "L" between the double row outer raceway surfaces 2a, 2b determines whether or not to provide the hardened layer 13 at shoulder portions 16, 17 between the double row outer raceway surfaces 2a, 2b. When the distance "L" is longer than a predetermined value (14 mm), the hardened layers 13, 13 are formed only in the double row outer raceway surfaces 2a, 2b. The shoulder portions 16, 17 remain as non-hardened portions. This makes it possible to solve the problem of improving the impact resistance, strength, durability and accuracy and reduction of manufacturing cost of the bearing apparatus and thus to extend its life.

As previously described, the wheel hub 4 and the outer member 2 are formed of medium/high carbon steel include C, 0.40-0.80 wt % (preferably 0.70-0.80 wt %), Si: 0.5-1.0 wt %, Mn: 0.1-2.0 wt %, Cr: 0.4-1.0 wt %, O: 0.003 wt % or less, and residues of Fe and inevitable impurities. In addition, the hardness at a depth of 0.1 mm from the surface of the hardened layers 8, 13 of the raceway surfaces is set at a hardness of 670 Hv or more. The grain size number of austenite crystal grains of metallographic structure in the hardened layers 8, 13 is selected larger than #7 defined by ASTM (American Society for Testing Materials).

The austenite crystal grains include any grain boundary that can be observed by applying treatments to expose the grain boundary, such as etching to samples of objective members. The former grain size number of austenite crystal grains may be used other than ASTM. The grain size can be obtained in accordance with ASTM measuring method or by converting average values of the grain size number of JIS (JIS G 0551 Method for testing austenite crystal grain size of steel) to average grain size.

The hardness or the austenite crystal grain is one of factors giving an influence to the nature of steel material in the hardened layers 8, 13. The higher the hardness, the finer the austenite crystal grains and thus the higher the impact value. As clearly apparent from a graph of FIG. 4, the ASTM grain size#7 has an impact value in surface 2.5 times an impact value of the ASTM grain size#4.

Since the hardness in a portion at a depth of 0.1 mm from the surface of the hardened layers 8, 13 is set with a hardness higher than 670 Hv, it is possible to suppress an amount of elastic deformation caused by the compressive stress applied by the rolling elements 3. Thus, this suppresses the shearing stress applied to each raceway surface. In addition, since that the grain size number of austenite crystal grains of the metallographic structure in the hardened layers 8, 13 is selected larger than #7, it is possible to improve the durability against bending stress and tensile stress caused by a moment load applied to the bearing apparatus via, the wheel mounting flange 6. Thus, this reduces stress concentration caused in austenite crystal grain boundaries, improves the rolling fatigue life while suppressing opening of fatigue cracks, and also improves the impression resistance while increasing the anti-impact value.

The heating temperature of hot forging is set within a predetermined range in order to minimize the austenite crystal grain size. That is, the heating temperature during high frequency induction quenching to form the hardened layers 8, 13 is set in a range of 900-1100° C. If the heating temperature exceeds 1100° C., the austenite crystal grain size will be grown to a bulky size. On the other hand, if the heating temperature is lower than 900° C., the metallographic structure cannot be sufficiently softened. Thus, the workability will be extremely diminished.

Alloy elements Mn, Si, Cr, S, O are added into the steel material to form the outer member 2 and the wheel hub 4 other than C. Mn is added at an amount of 0.1-2.0 wt % to improve the easiness of quenching and to form the predetermined hardened layers as previously mentioned. If the amount of Mn is less than 0.1 wt %, the thickness of the hardened layers cannot be sufficiently obtained. On the other hand, if the amount of Mn exceeds 2.0 wt %, the workability will be diminished.

An element Si is added at an amount of 0.5-1.0 wt % to improve the rolling fatigue life while strengthening the martensite. If the amount of Si is less than 0.5 wt %, effects of the ease of quenching cannot be sufficiently obtained. On the other hand, if the amount of Si exceeds 1.0 wt %, not only is the workability diminished but the decarburization after forging is increased.

Similar to Si, an element Cr can also improve the rolling fatigue life while strengthening the martensite. Thus it is added at an amount of 0.4-1.0 wt %. If the amount of Cr is less than 0.4 wt %, effects of the ease of quenching cannot be sufficiently obtained. On the other hand, if the amount of Cr exceeds 1.0 wt %, the workability is diminished.

An element S is also added. However, since it is believed that S tends to form non-metallic inclusions such as MnS in steel and form an initial point to cause peeling in the hardened layer, it is preferable that the amount of S is as little as possible and thus limited to 0.03 wt % or less. Similarly, since an element O tends to form non-metallic inclusions, such as $Al_2O_3$ in steel, and thus exerts a bad influence on the rolling fatigue life, the amount of O is limited to 0.003 wt % or less.

In addition other alloy elements are added to the steel material to suppress the growth of austenite crystal grains and to refine them. More concretely, an element V is added at an amount of 0.01-0.15 wt %. V tends to form carbides of high hardness in steel and is effective to improve the abrasion resistance and the rolling fatigue life. If the amount of V exceeds 0.15 wt %, the workability will be diminished. On the other hand, if the amount of V is less than 0.01 wt %, effects for improving the life cannot be expected. Other elements such as Nb or Ti exhibiting similar effects may be added other than V.

As described above, according to the first embodiment, a pitch circle diameter PCDo of the outer-side ball group 3 is larger. Due to a difference in the pitch circle diameters PCDi and PCDo, the number of balls of the ball group 3 in the outer-side is larger than the number of balls of the ball group 3 in the inner-side. Thus, it is possible to extend the life of the wheel bearing apparatus in a macro-view point while increasing the outer-side bearing rigidity compared with the inner-side bearing rigidity by effectively utilizing the bearing space. In addition, since predetermined hardened layers are formed by high frequency induction quenching etc. on the predetermined steel member of the bearing apparatus, it is possible to extend the life of the wheel bearing apparatus in a micro-view point while assuring the impression resistance.

FIG. 5 is a longitudinal section view of a second embodiment of a vehicle wheel bearing apparatus. This embodiment is an example applied to a driving wheel. The same reference numerals are used to designate the same parts having the same functions used in the first embodiment and their detail description will be omitted.

The vehicle bearing apparatus shown in FIG. 5 is a third generation type used for a driving wheel. It includes an inner member 18, an outer member 19, and double row rolling element (ball) groups 3, 3 rollably contained between the inner and outer members 18, 19. The inner member 18 includes the wheel hub 20. An inner ring 5 is press fit on the wheel hub 20 via a predetermined interference.

The wheel hub 20 is integrally formed with a wheel mounting flange 6 at its outer-side end. One (outer-side) inner raceway surface 4a is on its outer circumference. A cylindrical portion 4b extends from the inner raceway surface 4a through a shaft-shaped portion 7. The wheel hub 20 is also formed on its inner circumference with a serration (spline) 20a for transmitting a torque.

Although the outer diameter of each ball 3 is the same, a pitch circle diameter PCDo of the outer-side ball group 3 is set larger than a pitch circle diameter PCDi of the inner-side ball group 3. Due to a difference in the pitch circle diameters PCDi and PCDo, the number of balls of the ball group 3 in the outer-side is larger than the number of balls of the ball group 3 in the inner-side.

The wheel hub 20 has an outline configuration continued from a groove bottom of the inner raceway surface 4a to the cylindrical portion 4b through a counter portion 15. The shaft-shaped portion 7 axially extends from the counter portion 15. A shoulder 7b abuts against the inner ring 5. The wheel hub 20 is formed with a predetermined hardened layer 8 that includes the inner raceway surface 4a, a portion of the shaft-shaped portion 7, the stepped portion 7c, the shoulder portion 7b and the cylindrical portion 4b. The depth of the hardened layers 8 is designed to satisfy a desirable rolling fatigue life so that it has an effective hardened depth (3.5 mm) of about five times the depth in case of the maximum shearing stress depth.

The outer member 19 is integrally formed, on its outer circumference, with a body mounting flange 2c to be mounted on a knuckle (not shown) of a vehicle. Its inner circumference has an outer-side outer raceway surface 2a opposite to the inner raceway surface 4a of the wheel hub 20 and an inner-side outer raceway surface 2b opposite to the inner raceway surface 5a of the inner ring 5. Double row ball groups 3, 3 are contained between the outer and inner raceway surfaces and are rollably held by cages 9, 10.

The outer-side outer raceway surface 2a of the outer member 19 has a diameter larger than the diameter of the inner-side outer raceway surface 2b. This is due to a difference in the pitch circle diameters PCDo and PCDi. A step portion 19a with a circular arc cross-section is formed between a shoulder portion 16 of the outer-side outer raceway surface 2a and a shoulder portion 17 of the inner-side outer raceway surface 2b. The outer member 19 is made of medium/high carbon steel including carbon of 0.40~0.80% by weight such as S53C. The double row outer raceway surfaces 2a, 2b are formed with a hardened layer 13 (shown by cross-hatching in an upper half in FIG. 5) that is hardened by high frequency induction quenching to have a surface hardness of 58~64 HRC.

Similarly to the first embodiment, the minimum wall thickness t1, t2 are set at 4 mm with the remaining non-quenched portion of about 0.5 mm. In addition, since the distance "L" between the double row outer raceway surfaces 2a, 2b is longer than 14 mm, the hardened layers 13, 13 are formed only in the double row outer raceway surfaces 2a, 2b. The shoulder portions 16, 17 remained as non-hardened portions. This makes it possible to solve the problems of improving the impact resistance, strength, durability and accuracy and reduction of manufacturing cost of the bearing apparatus and thus to extend its life.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

The vehicle wheel bearing apparatus of the present disclosure can be applied to any of the bearing apparatus of the first through fourth generations irrespective of the driving wheel or the driven wheel.

What is claimed is:

1. A vehicle wheel bearing apparatus comprising:
   an outer member formed, on its inner circumference, with double row outer raceway surfaces and shoulder portions are formed between the double row outer raceway surfaces, the shoulder portions are formed as cylindrical portions, a step portion, with a tapered or circular arc cross section, is formed between the cylindrical portions, the outer member having a thin wall with a minimum wall thickness at the double row outer raceway surfaces is set at about 4 mm to reduce the size and weight of the wheel bearing apparatus while increasing rigidity;
   an inner member includes a wheel hub that is integrally formed with a wheel mounting flange at its one end, said wheel hub outer circumference surface includes double row inner raceway surfaces arranged opposite to the double row outer raceway surfaces;
   double row balls are freely rollably contained between the outer raceway surfaces and inner raceway surfaces, respectively, of the outer member and the inner member;
   a pitch circle diameter of the double row ball group of the outer-side is larger than a pitch circle diameter of the double row ball group of the inner-side and the shoulder portions are axially parallel on the outer member and the shoulder portions are at different radial distances from an axis of the bearing;
   at least the outer member and the wheel hub are formed of medium/high carbon steel including carbon of 0.40-0.80% by weight;
   the inner and outer raceway surfaces are formed, respectively, with predetermined hardened layers having a surface hardness of 58~64 HRC;
   a grain size number of austenite crystal grains of a metallographic structure in the hardened layers is selected larger than #7; and
   a distance (L) exists between the double row outer raceway surfaces, the distance (L) is equal to or greater than 14 mm, a hardened layer is provided only in the double row outer raceway surfaces and the shoulder portions and step portion remain as non-hardened portions and the hardened layer on the double row outer raceway surfaces between ends of the outer raceway surfaces is substantially constant and the hardened layer is prohibited from spreading down the shoulder to make it possible to provide impact resistance, strength, durability and accuracy and provide a reduction of manufacturing costs of the bearing apparatus.

2. The vehicle wheel bearing apparatus of claim 1 wherein the outer diameter of each ball of the ball groups is the same as each other, and the number of balls of the outer-side is larger than the number of balls of the inner-side.

3. The vehicle wheel bearing apparatus of claim 1, wherein the outer member and the wheel hub are formed of medium/high carbon steel that include Si: 0.5-1.0 wt %, Mn: 0.1-2.0 wt %, Cr: 0.4-1.0 wt %, O: 0.003 wt % or less, and residues of Fe and inevitable impurities.

4. The vehicle wheel bearing apparatus of claim 1, wherein V of 0.01-0.15 wt % is added to the outer member and the wheel hub.

5. The vehicle wheel bearing apparatus of claim 1, wherein an effective depth of the hardened layers of the outer members is set at least at 2 mm and the minimum wall thickness at these portions is set at least at 4 mm.

6. A vehicle wheel bearing apparatus comprising:
   an outer member formed, on its inner circumference, with double row outer raceway surfaces and shoulder portions are formed between the double row outer raceway surfaces, the shoulder portions are formed as cylindrical portions, a step portion, with a tapered or circular arc cross section, is formed between the cylindrical portions, the outer member having a thin wall with a minimum wall thickness at the double row outer raceway surfaces is set at about 4 mm to reduce the size and weight of the wheel bearing apparatus while increasing rigidity;
   an inner member includes a wheel hub that is integrally formed with a wheel mounting flange at its one end, said wheel hub outer circumference surface includes double row inner raceway surfaces arranged opposite to the double row outer raceway surfaces;

double row balls are freely rollably contained between the outer raceway surfaces and inner raceway surfaces, respectively, of the outer member and the inner member;

a pitch circle diameter of the double row ball group of the outer-side is larger than a pitch circle diameter of the double row ball group of the inner-side and the shoulder portions are axially parallel on the outer member and the shoulder portions are at different radial distances from an axis of the bearing;

at least the outer member and the wheel hub are formed of medium/high carbon steel including carbon of 0.40~0.80% by weight;

the inner and outer raceway surfaces are formed, respectively, with predetermined hardened layers having a surface hardness of 58~64 HRC;

a grain size number of austenite crystal grains of a metallographic structure in the hardened layers is selected larger than #7;

a distance (L) exists between the double row outer raceway surfaces, when the distance (L) is less than 14 mm, a hardened layer is provided at the shoulder portions and step portion between the double row outer raceway surfaces, the hardened layer on the double row outer raceway surfaces between ends of the outer raceway surfaces is substantially constant to make it possible to provide impact resistance, strength, durability and accuracy and provide a reduction of manufacturing costs of the bearing apparatus; and wherein the inner member comprises the wheel hub having the wheel mounting flange at its one end and is formed on its outer circumference surface with one inner raceway surface arranged oppositely to one of the double row outer raceway surfaces and a cylindrical portion axially extends from the inner raceway surface, and an inner ring formed, on its outer circumference surface, with the other inner raceway surface arranged opposite to the other of the double row outer raceway surfaces, said inner ring being axially secured by a caulked portion formed by radially outwardly plastically deforming an end of the cylindrical portion, a substantially conical recess is formed on an end at the side of the wheel mounting flange of the wheel hub, the depth of the recess extends at least to a position near the bottom of the inner raceway surface of the wheel hub, and the recess is formed so that the wall thickness of the wheel hub at its outer-side end portion is substantially constant.

7. The vehicle wheel bearing apparatus of claim 6, wherein the outer diameter of each ball of the ball groups is the same as each other, and the number of balls of the outer-side is larger than the number of balls of the inner-side.

8. The vehicle wheel bearing apparatus of claim 6, wherein the outer member and the wheel hub are formed of medium/high carbon steel that include Si: 0.5-1.0 wt %, Mn: 0.1-2.0 wt %, Cr: 0.4-1.0 wt %, O: 0.003 wt % or less, and residues of Fe and inevitable impurities.

9. The vehicle wheel bearing apparatus of claim 6, wherein V of 0.01-0.15 wt % is added to the outer member and the wheel hub.

10. The vehicle wheel bearing apparatus of claim 6, wherein an effective depth of the hardened layers of the outer members is set at least at 2 mm and the minimum wall thickness at these portions is set at least at 4 mm.

\* \* \* \* \*

UNITED STATES PATENT AND TRADEMARK OFFICE
CERTIFICATE OF CORRECTION

PATENT NO. : 9,097,284 B2  
APPLICATION NO. : 12/465752  
DATED : August 4, 2015  
INVENTOR(S) : Hisashi Ohtsuki et al.

Page 1 of 1

It is certified that error appears in the above-identified patent and that said Letters Patent is hereby corrected as shown below:

In The Specification

Column 2  
Line 49  "(D1 D2)" should be --(D1>D2)--

Column 8  
Line 61  "C 0.40-0.80 wt%" should be --C: 0.40-0.80 wt%--

Column 9  
Line 40  "900-1100° C" should be --900-1100°C--  
Line 41  "1100° C" should be --1100°C--  
Line 43  "900° C" should be --900°C--

In The Claims

Column 12  
Line 14-15, Claim 1  "0.40-0.80" should be --0.40~0.80--

Signed and Sealed this  
Twenty-sixth Day of January, 2016

Michelle K. Lee  
*Director of the United States Patent and Trademark Office*